US010159949B2

(12) United States Patent
Chou et al.

(10) Patent No.: US 10,159,949 B2
(45) Date of Patent: Dec. 25, 2018

(54) ADVANCED FLUID PROCESSING METHODS AND SYSTEMS

(71) Applicant: Fujifilm Planar Solutions, LLC, Mesa, AZ (US)

(72) Inventors: Shih-Pin Chou, Hsinchu (TW); Wen-Hung Chang, Gilbert, AZ (US); Deepak Mahulikar, Leander, TX (US); Tamas Varga, Mesa, AZ (US); Abhudaya Mishra, Gilbert, AZ (US)

(73) Assignee: Fujifilm Planar Solutions, LLC, Mesa, AZ (US)

( * ) Notice: Subject to any disclaimer, the term of this patent is extended or adjusted under 35 U.S.C. 154(b) by 0 days.

(21) Appl. No.: 15/432,099

(22) Filed: Feb. 14, 2017

(65) Prior Publication Data

US 2017/0259229 A1    Sep. 14, 2017

Related U.S. Application Data

(60) Provisional application No. 62/306,795, filed on Mar. 11, 2016.

(51) Int. Cl.
*B01F 13/10* (2006.01)
*B01F 15/02* (2006.01)
(Continued)

(52) U.S. Cl.
CPC .......... *B01F 13/1055* (2013.01); *B01F 3/088* (2013.01); *B01F 3/0861* (2013.01); *B01F 3/1214* (2013.01); *B01F 3/1221* (2013.01); *B01F 3/2261* (2013.01); *B01F 5/10* (2013.01); *B01F 7/00633* (2013.01);
(Continued)

(58) Field of Classification Search
None
See application file for complete search history.

(56) References Cited

U.S. PATENT DOCUMENTS 4,533,254 A   8/1985   Cook et al.
5,759,917 A   6/1998   Grover et al.
(Continued)

FOREIGN PATENT DOCUMENTS

DE   102014202016   8/2015   ............... C09J 5/00
EP   1 541 653       6/2005   ............... C09G 1/02
(Continued)

OTHER PUBLICATIONS

International Search Report and Written Opinion of the International Searching Authority for International Application No. PCT/US2017/017785 dated May 11, 2017.
(Continued)

*Primary Examiner* — Jiong-Ping Lu
(74) *Attorney, Agent, or Firm* — Fish & Richardson P.C.

(57) ABSTRACT

This disclosure features methods of forming chemical compositions. The method includes (1) mixing a plurality of continuous material flows in a mixing tank to form a chemical composition, each continuous material flow including at least one component of the composition; and (2) moving a continuous flow of the chemical composition to a packaging station downstream of the mixing tank. The mixing and moving steps are performed continuously. This disclosure also features systems that can be used to perform such methods.

40 Claims, 4 Drawing Sheets

(51) Int. Cl.
*B01F 3/08* (2006.01)
*B24B 57/02* (2006.01)
*B24B 57/00* (2006.01)
*B01F 3/22* (2006.01)
*B01F 5/10* (2006.01)
*B01F 15/00* (2006.01)
*C09G 1/02* (2006.01)
*B01F 7/00* (2006.01)
*B01F 3/12* (2006.01)

(52) U.S. Cl.
CPC .... *B01F 15/0022* (2013.01); *B01F 15/00194* (2013.01); *B01F 15/00227* (2013.01); *B01F 15/00285* (2013.01); *B01F 15/02* (2013.01); *B01F 15/0201* (2013.01); *B01F 15/0202* (2013.01); *B01F 15/0203* (2013.01); *B24B 57/00* (2013.01); *B24B 57/02* (2013.01); *C09G 1/02* (2013.01); *B01F 2215/0045* (2013.01)

(56) References Cited

U.S. PATENT DOCUMENTS

| 5,993,686 | A | 11/1999 | Streinz et al. |
| 6,146,008 | A | 11/2000 | Laederich et al. |
| 6,227,695 | B1 | 5/2001 | Kubiak et al. |
| 6,290,384 | B1 | 9/2001 | Pozniak et al. |
| 6,554,467 | B2 | 4/2003 | Snyder et al. |
| 6,656,359 | B1 | 12/2003 | Osuda et al. |
| 6,923,568 | B2 | 8/2005 | Wilmer et al. |
| 8,702,297 | B2 | 4/2014 | Urquhart et al. |
| 2002/0003225 | A1 | 1/2002 | Hampden-Smith et al. |
| 2002/0048213 | A1 | 4/2002 | Wilmer et al. |
| 2002/0055548 | A1 | 5/2002 | Ragsdale |
| 2002/0186613 | A1 | 12/2002 | Hiraoka et al. |
| 2009/0198036 | A1 | 8/2009 | Duffy |
| 2009/0287358 | A1 | 11/2009 | Lewis et al. |
| 2013/0067998 | A1 | 3/2013 | Mohseni et al. |
| 2013/0199663 | A1 | 8/2013 | Newbold et al. |
| 2014/0261824 | A1* | 9/2014 | Byers ..................... B24B 57/02 137/896 |
| 2016/0222252 | A1 | 8/2016 | Minami et al. |

FOREIGN PATENT DOCUMENTS

| GB | 2 482 108 | 1/2012 | ............ A23C 9/154 |
| KR | 2003-0013146 | 2/2003 | ............... C09K 3/14 |
| WO | WO99/41002 | * 8/1999 | ................ B01F 1/00 |
| WO | WO 99/41002 | 8/1999 | ................ B01F 3/00 |
| WO | WO 2008/046519 | 4/2008 | ............. B01F 13/10 |
| WO | WO 2014/078398 | 5/2014 | ............. G05D 11/02 |
| WO | WO 2015/037311 | 3/2015 | ........... H01L 21/304 |

OTHER PUBLICATIONS

European Search Report for European Application No. EP 17 15 8131 dated Sep. 15, 2017.
EPO Extended Search Report for EPO Application No. 17158131.7 dated Feb. 26, 2018.
Korean Office Action from the Korean Patent Office, Korean Application No. 10-2017-0030334 dated Jun. 11, 2018.

* cited by examiner

--PRIOR ART --

-- PRIOR ART --

# ADVANCED FLUID PROCESSING METHODS AND SYSTEMS

CROSS-REFERENCE TO RELATED APPLICATION

The present application claims priority to U.S. Provisional Application Ser. No. 62/306,795, filed on Mar. 11, 2016, the contents of which are hereby incorporated by reference in its entirety.

TECHNICAL FIELD

This disclosure relates to methods of continuous fluid processing, as well as related systems and components.

BACKGROUND

Mixing is a process in which two or more substances are combined while the chemical properties of each substance remain largely unchanged. The properties of the overall mixture, however, can differ from those of the component substances. Thus, mixing is often used to produce a medium with a desired set of physical and chemical properties which can be confirmed by analytical techniques.

For example, in semiconductor fabrication, chemical mechanical planarization/polishing (CMP) is used to make wafer surfaces flat. This process requires use of a slurry containing abrasive particles dispersed in a liquid chemical composition (such as those containing an acid and/or a base). The CMP slurry is typically manufactured by mixing various chemicals and abrasive particles to form a dispersion (e.g., a colloidal dispersion). During CMP, movement of the abrasive particles on the wafer mechanically removes material from the wafer surface. The acid or base in the slurry facilitates the chemical removal of material by reacting with the material to be removed. Hence, the process is called "chemical" "mechanical" polishing. To produce CMP slurries having desired properties, it can be useful to filter the CMP slurries to achieve the desired distribution of abrasive particles dispersed within the chemically reactive agents. The filtration also ensures that the end CMP product has high purity.

As the semiconductor wafers become more advanced, the features on the wafer surfaces become finer and more complex. Planarizing these complex fine features requires very tight polish processing windows. Hence the CMP process requires that the CMP slurry property specifications are very tight. This, in turn, is forcing the CMP slurry manufacturers to significantly improve their production process capability while reducing variations between lots. The conventional slurry production processes are unable to meet these stringent demands.

Conventional slurry manufacturing processes include a Batch process (FIG. 2) and a Continuous Process (FIG. 3). In a batch process, all the slurry components are added to a large tank one by one (usually by a fluid transfer unit such as a pump, and/or a flow controller unit), followed by mixing the components by an agitator type device and a QC (quality control) step. After that, the mixed slurry is sent to packaging station usually through a filter station. The batch process suffers from many drawbacks including a large environmental footprint, long addition and mixing times, high property variations, low throughput, and high production costs.

A conventional continuous process (FIG. 3), on the other hand, replaces the very large tanks in the batch process with smaller tanks, and introduces in-line static or dynamic mixers. The raw materials are fed into these in-line mixers one by one (but never all together in one mixer). This design allows the process to be continuous and increases the throughput. However, the in-line mixers are small and create high back pressures. Each raw material flow component loop going to the in-line mixer creates flow control issues causing significant property variations. Thus, the continuous process cannot meet the tight specification demands either.

This disclosure describes an Advanced Continuous Process and related system that addresses these shortcomings.

SUMMARY

This disclosure is based on the unexpected discovery that using a tank (e.g., a relatively small tank) in which materials (e.g., materials for producing a CMP slurry) are concurrently received and mixed in a continuous fluid process can result in reduced product variations and reduced product waste, thereby significantly increasing manufacturing efficiency, manufacturing yields, and product consistency, and reducing manufacturing costs (e.g., for producing a CMP slurry).

In one aspect, this disclosure features a method of forming a chemical composition (e.g., a polishing composition such as a CMP slurry). The method includes A) mixing a plurality of continuous material flows in at least one mixing tank to form a chemical composition, each continuous material flow comprising at least one component of the chemical composition; and B) moving a continuous flow of the chemical composition to a packaging station downstream of the at least one mixing tank. The mixing and moving steps are performed continuously, the material and chemical composition flows are in an in-process steady state; and the mixing process in the at least one mixing tank includes at least one mixing method selected from the group consisting of turbulent mixing of the material flows, mechanical agitation of the material flows, recirculation of the chemical composition, and a combination thereof.

In another aspect, this disclosure features a system that includes (1) a plurality of material tanks, each material tank being configured to receive a material used to form a chemical composition (e.g., a polishing composition such as a CMP slurry); (2) at least one mixing tank in which the materials from the material tanks are mixed to form a chemical composition, wherein the mixing tank is in fluid communication with the plurality of material tanks, the mixing tank is configured to continuously receive the materials from the material tanks and to continuously deliver the chemical composition downstream, and the mixing tank optionally includes a recirculation loop in fluid communication with the mixing tank; (3) optionally, at least one holding tank downstream from the mixing tank and in fluid communication with the mixing tank; and (4) optionally, at least one filter apparatus in fluid communication with the mixing tank, the filter apparatus being configured to receive and filter the chemical composition. The system does not include an in-line static or dynamic mixer between each material tank and the mixing tank.

Embodiments can include one or more of the following features:

In some embodiments, the method further includes obtaining a material flow having a substantially constant flow rate prior to the mixing step. In such embodiments, obtaining a material flow having a substantially constant flow rate includes continuous recirculation of the material flow in a material tank through at least one fluid transfer unit and at least one flow control unit until a predetermined flow rate is reached.

In some embodiments, the method further includes performing an in-process quality control measurement of the chemical composition in the mixing tank without interrupting the continuous process.

In some embodiments, the method further includes measuring the amount of a component in the mixing tank to determine whether the amount is within a predetermined range. In some embodiments, the measuring step is performed without stopping the mixing or moving step.

In some embodiments, before moving the continuous flow of the chemical composition to the packaging station, the method further includes at least one step selected from the group consisting of measuring a mass flow rate of each continuous material flow, measuring the volume flow rate of each continuous material flow, and measuring a content weight in a tank that supplies a continuous material flow containing at least one component.

In some embodiments, the mixing tanking does not include a stirrer or a baffle.

In some embodiments, the mixing tank has a volume of from about 40 liters to about 1,500 liters.

In some embodiments, the chemical composition is a polishing composition prepared from components including a diluent, an acid, a base, a salt, and abrasive particles.

In some embodiments, the diluent includes deionized water.

In some embodiments, the acid includes an organic acid, an inorganic acid, or a mixture thereof.

In some embodiments, the base includes potassium hydroxide, ammonium hydroxide, quaternary ammonium compounds (e.g., tetramethyl ammonium hydroxide or tetrabutyl ammonium hydroxide), monoethanol amine, diethanol amine, triethanol amine, or a mixture thereof.

In some embodiments, the salt includes potassium citrate, potassium carbonate, ammonium nitrate, ammonium sulfate, ammonium citrate, ammonium oxalate, potassium nitrate, potassium sulfate, potassium chloride, or a mixture thereof.

In some embodiments, the abrasive particles include silica (e.g., colloidal silica), ceria, titania, alumina, or a mixture thereof.

In some embodiments, the continuous flow of the chemical composition includes at most about 50 wt % silica.

In some embodiments, the continuous flow of the chemical composition has a pH of from about 2 to about 11 (e.g., from about 2 to about 9).

In some embodiments, the method further includes continuously moving the chemical composition into a holding tank prior to packaging.

In some embodiments, the method further includes filtering the continuous flow of the chemical composition before moving the continuous flow of the chemical composition to the packaging station.

In some embodiments, the continuous flow of the chemical composition exiting the mixing tank has a volume flow rate of at least about 20 liters per minute.

In some embodiments, the method forms a chemical composition having a total lot-to-to variation or a total within lot variation of at most about 1% in the weight of a component.

In some embodiments, the mixing tank includes at least one mixing system. In such embodiments, the mixing system can include an agitator (e.g., a mechanical agitator), a vortex, a turbulent mixer, a recirculation loop, or a combination thereof.

In some embodiments, the system further includes at least one quality determination unit that is attached integrally to a system component. In such embodiments, the quality determination unit can include a pH meter, a conductivity meter, a concentration meter, or a LPC (Large Particle Count) meter.

In some embodiments, the system further includes a fluid transfer unit (e.g., a pump) in fluid communication with each material tank, the fluid transfer unit being configured to continuously transfer the material in each material tank to the mixing tank.

In some embodiments, the system further includes a fluid flow controller unit (e.g., a mass flow controller) between each material tank and the mixing tank, the fluid flow controller unit being configured to adjust the flow rate (e.g., the mass flow rate) of the material transferred from each material tank to the mixing tank.

In some embodiments, the system includes a load cell in contact with each material tank, the load cell being configured to measure the content weight in each material tank.

In some embodiments, the system further includes a holding tank in fluid communication with the mixing tank, the holding tank being configured to continuously receive the chemical composition from the mixing tank.

In some embodiments, the holding tank has a volume of from about 1,500 liters to about 20,000 liters.

In some embodiments, the system further includes the filter apparatus.

In some embodiments, the system further includes a packaging station downstream of the mixing tank, the packaging station being configured to packaging the chemical composition.

In some embodiments, the system further includes a recirculation loop in fluid communication with the mixing tank, the recirculation loop being configured to recirculate the chemical composition back to the mixing tank.

In some embodiments, the system further includes a plurality of fluid transfer units, wherein each fluid transfer unit is configured to continuously transfer a material from a system component (e.g., a material tank, a mixing tank, or a holding tank) to another system component (e.g., a mixing tank, a holding tank, or a packaging station).

In some embodiments, the system further includes at least one heating unit, wherein the heating unit is configured to independently heat a system component (e.g., a material tank, a mixing tank, or a holding tank).

Other features, objects, and advantages of the subject in this disclosure will be apparent from the description, drawings, and claims.

DESCRIPTION OF DRAWINGS

Like reference symbols in the various drawings indicate like elements.

DETAILED DESCRIPTION

Figure 1:
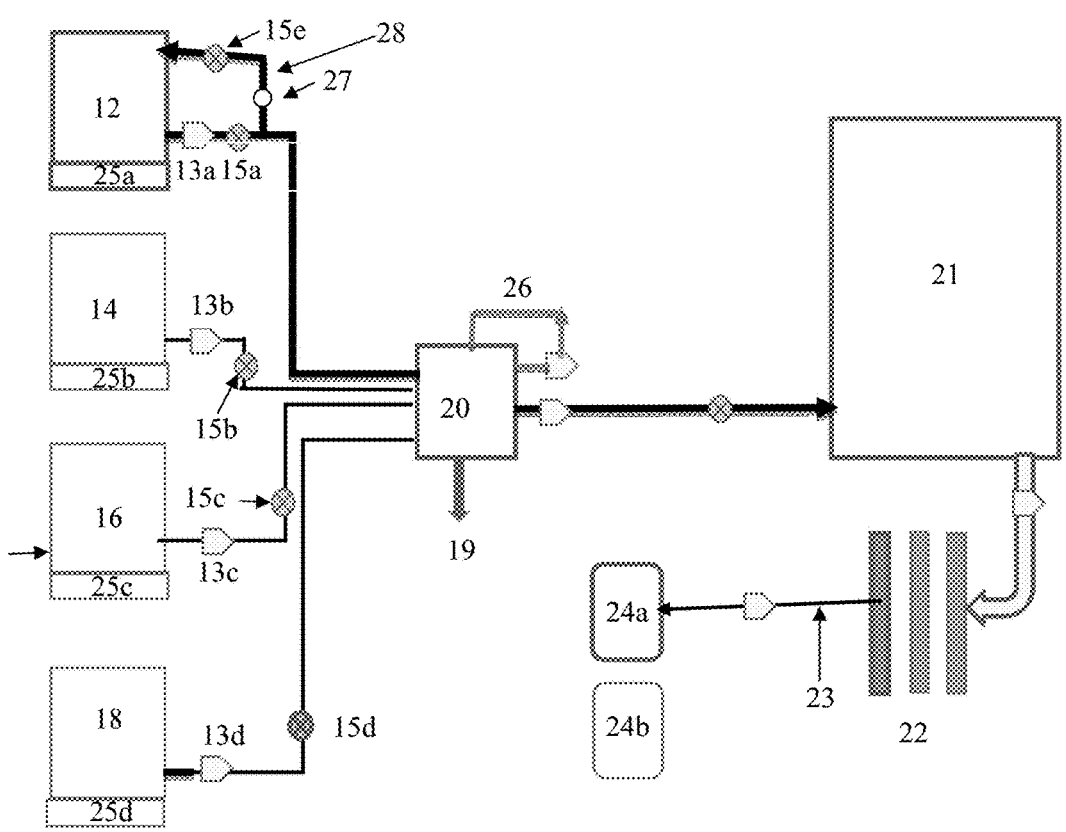
FIG. 1 is a schematic view of an embodiment of a blending system described in this disclosure. This blending system is also referred to as the ACP (Advanced Continuous Process) blending system.

Semiconductor chemicals, such as the CMP slurries, wet etch formulations and other wet compositions typically should have high quality yet low-cost. The high-quality requirement is necessary to ensure high semiconductor wafer yields. Therefore, semiconductor users demand very tight specifications for the CMP slurries and other wet compositions. In high-volume chemical manufacturing, it is a major challenge to assure very tight specifications, while still keeping the costs down. Conventional batch processes (such as the one shown in FIG. 2) are typically performed in a relatively large holding tank, and do not have mixing and packaging performed continuously. In a typical Batch blending process, the individual raw materials are added to the tank one by one, which takes a very long time. Subsequently, they are usually mixed by an in-situ agitator for a period of time, followed by a quality control (QC) measurement. If the QC measurement is within specification, the blended composition is moved to filtering and packaging. Batch processes occupy a large environmental foot print, take long time, and hence are costly. Conventional continuous processes have mixing and packaging performed continuously, but typically use static in-line mixers between material tanks and a holding tank to mix the material flows. The in line mixers result in pressure drops across them and require bigger pumps to overcome these pressure drops. They can also result in component variations. Both of these conventional processes do not meet the challenges of advanced semiconductor node applications. Surprisingly, the inventors have found that the systems and methods described herein, also referred to as Advanced Continuous Process (ACP), can produce high quality and low cost chemical compositions at a high throughput, to satisfy the advanced semiconductor node applications.

In general, this disclosure relates to methods of continuous fluid processing to form a chemical composition, as well as related systems and components.

In some embodiments, the chemical composition can be a liquid-based composition (e.g., a composition containing water, one or more organic solvents, or a mixture thereof), such as those used in a semiconductor process. Examples of suitable chemical compositions that can be formed by the methods and systems described herein include polishing compositions (e.g., chemical mechanical planarization (CMP) slurries), developers (e.g., TMAH developers), etching compositions, and cleaning compositions. Examples of polishing compositions that can be prepared by the systems and methods described herein have been described, for example, in U.S. Application Publication No. 2013-0067998. Examples of etching compositions that can be prepared by the systems and methods described herein have been described, for example, in U.S. Application Publication Nos. 2015-0267112 and 2012-0231632. Examples of etching compositions that can be prepared by the systems and methods described herein have been described, for example, in U.S. Application Publication Nos. 2015-0159125, 2015-0159124, and 2015-0111804.

FIG. 1 illustrates an embodiment of a blending system for producing a chemical composition (e.g., a polishing composition such as a CMP slurry). As shown in FIG. 1, the system includes a plurality of material tanks 12, 14, 16, and 18, a plurality of pumps 13a, 13b, 13c, and 13d, a plurality of mass flow controllers 15a, 15b, 15c, 15d, and 15e, a mixing tank 20, an optional holding tank 21, an optional filter apparatus 22, a packaging station 24a or 24b, an optional load cell 25, and optional recirculation loops 26 and 28, and an optional switch valve 27. As will be described in further detail below, the blending system can be operated to combine the components of a polishing composition in a continuous flow process with reduced product variations, high throughput, and low product waste.

Before the ACP process fully starts by using the blending system shown in FIG. 1, all the raw materials (e.g. components of the CMP slurry) can be "stabilized" (e.g., by obtaining a material flow having a substantially constant flow rate) to ensure that the amounts of raw materials going into the mixing tank meet the predetermined amounts. In some embodiments, depending on the desired amount of each component in the final chemical composition, the substantially constant flow rates of the material flows exiting material tanks 12, 14, 16, and 18 can be different from one another. In some embodiments, the stabilizing is done by recirculating the raw materials back to their respective material tanks through one or more fluid flow controller units (e.g., mass flow controllers). Once predetermined amounts are reached, the recirculation can be turned off and the materials can be delivered to the mixing tank. For example, as shown in FIG. 1, material tank 12 includes a recirculation loop 28, which includes a switch valve 27 and a mass flow controller 15e. In some embodiments, recirculation loop 28 can include two or more mass flow controllers 15e.

Before the ACP process starts, the material in material tank 12 can go through the recirculation loop 28 by opening switch valve 27 and closing a switch valve (not shown in FIG. 1) between material tank 12 and mixing tank 20. Once a predetermined amount is reached (as measured by mass flow controller 15a or 15e), switch valve 27 is closed and the switch valve between material tank 12 and mixing tank 20 is open so that the material in material tank 12 can be delivered to mixing tank 20. Although FIG. 1 shows that only one material tank (i.e., material tank 12) has a recirculation loop 28, other material tanks (i.e., material tanks 14, 16, and 18) can each have a recirculation loop This novel and important step reduces the variations in the mixing tank and helps establish an in-process steady state for the ACP process.

During use, the raw materials (e.g., components of a CMP slurry) are transferred from material tanks 12, 14, 16, and 18 to the package station 24 through mixing tank 20, optional holding tank 21, and optional filter apparatus 22 in a continuous flow. As used herein, "continuous flow" includes a bulk flow that is continuous in a downstream direction (e.g., a net flow rate that varies by less than about fifteen percent during steady-state operation) and/or substantially continuous in a downstream direction (e.g., a regularly pulsing flow with net movement in a downstream direction during steady-state operation).

The ACP system and process described in this disclosure are designed to achieve an in-process steady state. For example, in this state, mass input and mass output during the process run are substantially equalized. Mass input includes the sum of the amounts of all of the raw materials going into the mixing tank. Mass output includes the amount of the fully mixed slurry product exiting the mixing tank, which enters the optional holding tank, the optional filter apparatus, or the packaging station. When a mass balance for the entire blending system is established, the raw material continuous flows and the downstream composition flows are in in-process steady state. In this state, the final composition is packaged at a steady pre-targeted rate without interruption (e.g., while the mixing tank recirculation and in line quality control measurements are being done). In general, material tanks 12, 14, 16, and 18 can be any suitable tank and are configured to receive a material to form a chemical composition. In some embodiments, a material tank can include an inlet for receiving one or more of the components to be used to form the chemical composition. In some embodiments, a material tank can include an outlet for transferring the components to mixing tank 20. In some embodiments, a material tank can have an opening that serves as both the inlet and the outlet. In some embodiments, a material tank can be the tank used by a manufacturer for supplying a component.

In some embodiments, when the system is used to manufacture a polishing composition, each material tank 12, 14, 16, and 18 can receive one or more of the following materials: a diluent, an acid, a base, and an abrasive particle composition (e.g., an abrasive particle dispersion) containing abrasive particles. In such embodiments, each material tank 12, 14, 16, or 18 can optionally receive one or more of the following additional materials: corrosion inhibitors (e.g., benzotriazoles, triazoles, and azoles), oxidizers (e.g., hydrogen peroxide, ammonium persulfate, silver nitrate, ferric nitrates or chlorides, per acids or salts, ozone water, potassium ferricyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, $KMnO_4$, other inorganic or organic peroxides, or mixtures thereof), complexing agents, biocides, pH adjusters, and surfactants (e.g., cationic surfactants, anionic surfactants, nonionic surfactants, and amphoteric surfactants).

In some embodiments, a single raw material can be introduced through more than one of material tanks 12, 14, 16, and 18 (e.g., to improve mixing quality). In some embodiments, any number (e.g., two, three, or four) of material tanks 12, 14, 16, and 18 can be used to introduce the components to mixing tank 20. In some embodiments, only two material tanks 12 and 14 can be used in the system shown in FIG. 1. For example, the diluent, the acid, and the base can be pre-mixed and the mixture can be introduced through material tank 12, while the abrasive particle composition can be introduced through material tank 14. In certain embodiments, more than four (e.g., five, six, seven or more) material tanks can be used in the system shown in FIG. 1 to introduce the components to mixing tank 20.

As shown in FIG. 1, each pump 13a,b,c,d is disposed between and in fluid communication with a respective material tank 12, 14, 16, and 18 and a respective mass flow controller 15a,b,c,d. Each pump 13a,b,c,d is configured to move (e.g., continuously) a raw material from a respective material tank 12, 14, 16, and 18 through a respective mass flow controller 15a,b,c,d to mixing tank 20. In some embodiments, pumps 13a,b,c,d can be electro-mechanical diaphragm pumps including a sealed diaphragm with one side in fluid communication with the working fluid and the other side in communication with a motor drive. Fluid is pumped as the motor drive flexes the diaphragm.

In some embodiments, the system can include a load cell in contact with each of material tanks 12, 14, 16, and 18, such that the load cell is configured to measure the content weight in the material tank. For example, as shown in FIG. 1, each of load cells 25a, 25b, 25c, and 25d can be disposed beneath a material tank (i.e., tank 12, 14, 16, or 18) to measure its content weight. During operation, each load cell can monitor the content weight in a material tank and can ensure that each of material tanks 12, 14, 16, and 18 has enough material to be transferred to mixing tank 20. In some embodiments, the load cell can be a hydraulic load cells, a pneumatic load cell, or a strain gauge load cell.

In some embodiments, each pump 13a,b,c,d is in fluid communication with each material tank 12, 14, 16, and 18 and can draw the respective materials from the material tanks 12, 14, 16, and 18 continuously. The speed of each pump 13a,b,c,d can be adjusted (e.g., individually adjusted) to change the volume flow rate of a material moving through the respective pump 13a,b,c,d. In some embodiments, the speed of each pump 13a,b,c,d can be adjusted to adjust the Reynolds number of the combined flow of the continuous material flows (e.g., flows including the diluent, the acid, the base, and/or the abrasive particle composition) in mixing tank 20.

In some embodiments, each mass flow controller 15a,b,c,d can include an adjustable orifice and an internal regulating valve that maintains a constant pressure drop across the orifice to achieve a constant mass flow rate. The mass flow rates through the flow controllers 15a,b,c,d can be independently adjustable such that the raw materials can be combined in desired proportions. For example, the mass flow rates through the flow controllers 15a,b,c,d can be adjusted to achieve a target concentration of abrasive particles dispersed within the polishing composition. In certain embodiments, the mass flow rates through the flow controllers 15a,b,c,d can be adjusted to adjust the Reynolds number of the combined continuous material flow in mixing tank 20.

When the system shown in FIG. 1 is used to make a polishing composition, each material tank 12, 14, 16, and 18 can receive one or more of the following materials: a diluent, an acid, a base, and an abrasive particle composition.

The diluent can include, for example, deionized water. In some embodiments, as compared to water that is not deionized, the deionized water reduces ionic activity leading to the formation of salts and/or otherwise resulting in particle agglomeration. The addition of the diluent through one or more of the material tanks 12, 14, 16, and 18 can facilitate the use of concentrated acid, base, and/or abrasive particle compositions, which are generally less expensive to transport than the corresponding dilute compositions.

The acid can include, for example, an organic acid (e.g., a carboxylic acid or a sulfonic acid), an inorganic acid (e.g., hydrochloric acid, nitric acid, or sulfuric acid), or a mixture thereof. For example, the acid can include a carboxylic acid (e.g., citric acid, succinic acid, acetic acid, propionic acid, or oxalic acid), hydrochloric acid, sulfuric acid, nitric acid or a mixture thereof. In some embodiments, the acid introduced through one or more material tanks 12, 14, 16, and 18 can have an initial acid concentration of at least about 15% by weight and can be diluted in the continuous fluid process described herein such that the acid has a concentration of less than about 10% by weight (e.g., less than about 1% by weight) in the polishing composition.

The base can include, for example, potassium hydroxide, ammonium hydroxide, quaternary ammonium compounds (e.g., tetramethyl ammonium hydroxide or tetrabutyl ammonium hydroxide), monoethanol amine, diethanol amine, triethanol amine, or a mixture thereof. In some embodiments, the base can be introduced through one or more of material tanks 12, 14, 16, and 18 in an initial concentrated solution of at least about 15% by weight and can be diluted in the continuous fluid process described herein such that the base has a concentration of less than about 10% by weight (e.g., less than about 1% by volume) in the polishing composition.

The abrasive particle composition can include, for example, a water dispersion of silica, ceria, titania, alumina, or a mixture thereof. An example of an abrasive particle composition is colloidal silica. In some embodiments, the abrasive particle composition can include at least about 30 wt % (e.g., at least about 35 wt % or at least about 40 wt %) and/or at most about 50 wt % (e.g., at most about 45 wt % or at most about 40 wt %) of the abrasive particle (e.g., silica). In some embodiments, the polishing composition prepared from the abrasive particle compositions can include at most about 15 wt % (e.g., at most about 12 wt %, at most about 10 wt %, or at most about 8 wt %) and/or at least about 1 wt % (e.g., at least about 3 wt %, at least about 5 wt %, or at least about 7 wt %) of the abrasive particle (e.g., silica).

In some embodiments, the polishing composition can further include one or more salts. The salts can be neutral, basic, or acidic in nature. In some embodiments, the salts can be formed from the acid and base added into the polishing composition. In some embodiments, the salts can be added into the polishing composition independent of the acid and base described above. Exemplary salts that can be included in the polishing composition include carboxylate salts, sulfate salts, nitrate salts, halide salts, and phosphate salts, such as those formed with potassium or ammonium cation. For example, the salts can include potassium citrate, potassium carbonate, potassium nitrate, potassium sulfate, potassium chloride, ammonium nitrate, ammonium sulfate, ammonium citrate, ammonium oxalate.

In some embodiments, the polishing composition thus formed can have a pH ranging from at least about 2 (e.g., at least about 3, at least about 4, or at least about 5) to at most about 11 (e.g., at most about 10, at most about 9, or at most about 8).

As an example, material tanks 12, 14, 16, and 18 can receive one or more of deionized water, potassium hydroxide, citric acid, and a colloidal silica dispersion having a pH of 7, which are combined, according to methods described below, into a polishing composition having a final pH of about 10.2.

As shown in FIG. 1, the blending system can include a mixing tank 20 in which the materials from material tanks 12, 14, 16, and 18 are mixed to form a colloid dispersion. Mixing tank 20 is generally in fluid communication with the material tanks 12, 14, 16, and 18 (e.g., through mass flow controllers 15a,b,c,d). In some embodiments, mixing tank 20 is configured to continuously receive the materials from material tanks 12, 14, 16, and 18 to form a polishing composition and continuously deliver the polishing composition downstream (e.g., to packaging station 24a or 24b). In some embodiments, the blending system described herein can include two or more (e.g., three or four) mixing tank 20.

Figure 4:
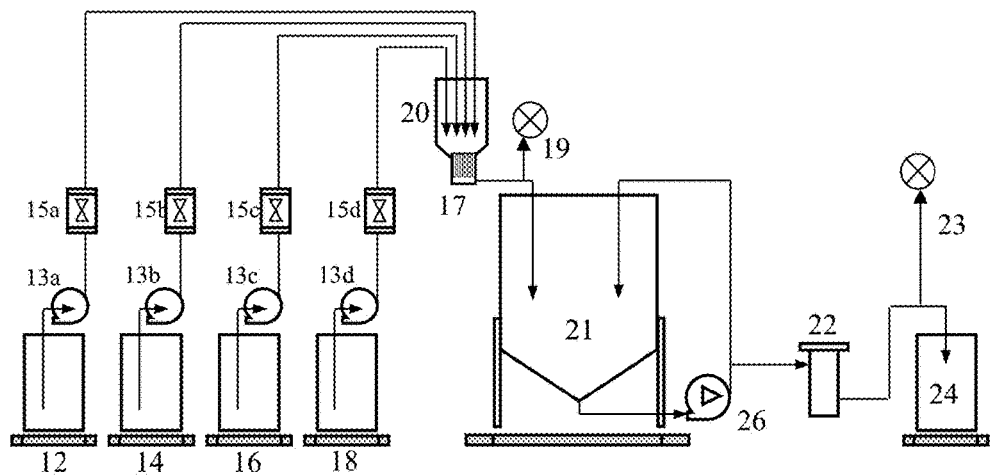
FIG. 4 is a drawing of another embodiment of the ACP blending system described in this disclosure.

In some embodiments, mixing tank 20 can have one or more inlets for receiving materials from material tanks 12, 14, 16, and 18 and at least one outlet for delivering the mixed polishing composition downstream. In some embodiments, mixing tank 20 does not include any mixing device, such as a stirrer (e.g., a mechanic or electrical stirrer) or a baffle, in the tank. In such embodiments, the continuous material flows from material tanks 12, 14, 16, and 18 can create a turbulent flow when they are introduced into mixing tank 20 and are mixed by this turbulent flow. As used herein, the "turbulent flow" is a flow that has a Reynolds numbers above about 4000. Without wishing to be bound by theory, it is believed that a turbulent flow of the materials in mixing tank 20 can facilitate formation of a stable polishing composition. In certain embodiments, mixing tank 20 may include a mixing device, such as a stirrer (e.g., a mechanic or electrical stirrer) or a baffle, in the tank. For example, FIG. 4 shows an embodiment of a blending system that includes a mixing device 17.

In some embodiments, mixing tank 20 can include a recirculation loop 26 that is in fluid communication with mixing tank 20 and facilitates the mixing in the tank. Recirculation loop 26 can include a pipe that connects between an outlet and an inlet on mixing tank 20 such that the liquid composition in mixing tank 20 can flow out of tank 20 and back into tank 20 through recirculation loop 26. In some embodiments, recirculation loop 26 can include a pump (not shown in FIG. 1) that controls the flow rate of the liquid stream in recirculation loop 26. In some embodiments, the pump can shut off recirculation loop 26 so that the loop is no longer in use. In some embodiments, recirculation loop 26 can include one or more in-line mixers (e.g., static or dynamic mixers). In some embodiments, the recirculation of the chemical composition in mixing tank 20 continues throughout the ACP process (i.e., without interrupting the ACP process) to ensure thorough mixing.

In some embodiments, mixing tank 20 has a volume of from at least about 10 liters (e.g., at least about 20 liters, at least about 40 liters, at least about 50 liters, at least about 80 liters, at least about 100 liters, at least about 200 liters, at least about 500 liters, or at least about 1000 liters) to at most about 1500 liters (e.g., at most about 1200 liters, at most about 1000 liters, at most about 750 liters, at most about 500 liters, at most about 400 liters, or at most about 250 liters). Without wishing to be bound by theory, it is believed that the volume of mixing tank 20 can be generally larger than the volume of an in-line mixer (e.g., a static mixer or a dynamic mixer) typically used in a conventional continuous process such that mixing tank 20 allows the components of a polishing composition (e.g., a CMP slurry) to be combined and mixed concurrently. The lower limit on the tank volume can be decided by the amounts and flow rates of the raw materials. For example, a small mix tank volume (e.g., 10 liters) may be enough if only 2 chemicals are going into mixing tank 20 at low flow rates. Further, without wishing to be bound by theory, it is believed that the volume of mixing tank 20 can be generally smaller than the volume of a tank typically used in a conventional batch process, thereby reducing the manufacturing costs and environmental impact of the process.

During operation, the materials from material tanks 12, 14, 16, and 18 can be continuously transferred into mixing tank 20 substantially at the same time, in which the materials are combined and mixed to form a chemical composition (e.g., a polishing composition). The chemical composition thus formed can be continuously moved downstream (e.g., to a filter apparatus or a package station). During the above continuous process, the amount of at least one component (e.g., the amounts of two, three, or all components) in mixing tank 20 can be measured (e.g., by using a HPLC, LC-MS, or ICP-OES, all of which are available at Thermo Fisher Scientific, Waltham, Mass.) in a quality control step 19 to determine if it is within a predetermined range for that component. If the amount of the component is within the predetermined range, the continuous process can continue without modification. If the amount of the component is outside of the predetermined range, the amount of the component can be adjusted (e.g., by adjusting one of mass flow controllers 15*a,b,c,d*) such that it falls within the predetermined range. In addition to the amount of the components, other quality-related parameters can also be measured using a sample from the mixing tank. These parameters include, but are not limited to, pH, conductivity, density, and mean particle size. Based on these measurements, further adjustments to material flows can be performed, if necessary. In some embodiments, such an in-process quality control measurement of the chemical composition in mixing tank 20 can be performed without interrupting the continuous process. In some embodiments, such an in-process quality control measurement can be performed by using at least one quality determination unit that is attached integrally to mixing tank 20. Examples of quality determination units include a pH meter, a conductivity meter, a concentration meter, and a LPC (Large Particle Count) meter. Such quality determination units can be attached integrally to other system components (such as a material tank, a hold tank, a filtering apparatus, or a connecting pipe) to perform in-process quality control measurements.

Without wishing to be bound by theory, it is believed that using mixing tank 20 in a continuous process can result in reduced product variations and reduced product waste compared to a conventional continuous process (such as a continuous process in which the components of a polishing composition are mixed one by one sequentially using an in-line mixer (e.g., an in-line static or dynamic mixer) between material tanks and a holding tank) or a conventional batch process. For example, the inventors surprisingly found that the polishing composition made by the ACP system shown in FIG. 1 can have a total lot-to-lot variation or a total within lot variation of at most about 1% (e.g., at most about 0.9%, at most about 0.8%, at most about 0.7%, at most about 0.6%, at most about 0.5%, at most about 0.4%, at most about 0.3%, at most about 0.2%, or at most about 0.1%) in the weight of a component (e.g., each component) and/or a quality-related parameter (e.g., pH, conductivity, density, and mean particle size). As used herein, the term "lot-to-lot variation" refers to the variations in a parameter of the final product between different lots (e.g., average variations from one lot to another lot). As used herein, the term "within lot variation" refers to the variations in a parameter of the final product within a particular lot (e.g., average variations from one package to another package). As used herein, the term "total variation" refers to the difference between the highest variation and the lowest variation for a given parameter. For example, the polishing composition thus prepared can have a total lot-to-lot variation of at most about 0.5% in the weight of at least one component or in at least one quality-related parameter (e.g., pH, conductivity, density, and mean particle size). By contrast, the systems and methods used in a conventional continuous process or a conventional batch process typically produce a product having a total lot-to-lot variation significantly higher than 0.5% in the weight of a component or a quality-related parameter (e.g., pH, conductivity, density, and mean particle size).

In some embodiments, the blending systems described herein do not include an in-line mixer (such as a static or dynamic mixer) between material tanks 12, 14, 16, and 18 and mixing tank 20. An in-line mixer typically includes a mixing device (e.g., a baffle), has only one inlet and one outlet, and has a small volume (e.g., at most about 10 liters). Such an in-line mixer typically is not designed to mix three or more components at the same time and therefore is significantly different from mixing tank 20 (which can mix three or more components at the same time). In some embodiments, the systems described herein can include one or more in-line mixers at locations other than between material tanks 12, 14, 16, and 18 and mixing tank 20, such as in optional recirculation loop 26 or 28.

In some embodiments, the blending system shown in FIG. 1 can include an optional filter apparatus 22. For example, when manufacturing a polishing composition (e.g., a CMP slurry), the system can include filter apparatus 22 to filter the polishing composition exiting mixing tank 20 to remove agglomerated particles or impurities. Details of the filters that can be used as filter apparatus 22 are provided, for example, in U.S. patent application Ser. No. 12/702,602, titled "Fluid Processing," filed on Feb. 9, 2010, and published as U.S. Patent Application Pub. 2010/0320127 A1, the entire contents of which are incorporated herein by reference. The filter apparatus can be either Depth/Profile filters with various pore ratings or Membrane filters. The filtration media for Depth filters are typically made from polypropylene, whereas the filtration media for Membrane filters are typically made from Nylon. The filters can be purchased from commercial sources, such as Pall Corporation (Port Washington, N.Y.), Entegris Inc. (Billerica, Mass.), and Roki America Co. Ltd. (Findlay, Ohio).

In some embodiments, an optional quality control step 23 can be performed to analyze the contents of the filtered polishing composition (e.g., to determine whether the amount of a component in the filtered polishing composition is within a predetermined range). If the filtered polishing composition meets the targeted specification, it can then flow to packaging station 24*a* or 24*b*. In some embodiments, at packaging station 24*a* or 24*b*, the polishing composition can be either used directly (e.g., in a CMP process to smooth wafers) or packaged for future use (e.g., at another location).

In some embodiments, when the ACP systems described herein are used to manufacture a chemical composition (e.g., a developer, an etching composition, or a cleaning composition) that does not contain particles or contain particles but their number and/or size are not of concern, filter apparatus 22 can be omitted or can be membrane type (absolute) filters which are much finer and suited for filtration of fine chemical formulations.

In some embodiments, the blending system described in FIG. 1 can include at least one (e.g., two, three, or more) optional holding tank 21. Holding tank 21 can be disposed between mixing tank 20 and optional filter apparatus 22, and in fluid communication with mixing tank 20 and filter apparatus 22. In some embodiments, holding tank 21 can be configured to continuously receive the polishing composition from mixing tank 20. In some embodiments, holding tank 21 can have a relatively large volume ranging from at least about 1,500 liters (e.g., at least about 2,000 liters, at least about 4,000 liters, at least about 5,000 liters, at least about 6,000 liters, at least about 8,000 liters, or at least about 10,000 liters) to at most about 20,000 liters (e.g., at most about 18,000 liters, at most about 16,000 liters, at most about 15,000 liters, at most about 14,000 liters or at most about 12,000 liters). In some embodiments, holding tank 21 can be used as a storage tank to store the polishing composition formed in mixing tank 20. In some embodiments, holding tank 21 can be used to control the quality of the polishing composition formed in mixing tank 20. For example, if it is unclear whether the polishing composition formed in mixing tank 20 meets the targeted specification, the polishing composition can be first moved to holding tank 21 where its contents are measured. Once it is confirmed that the polishing composition in holding tank 21 meets the targeted specification, the dispersion can be transferred to filter apparatus 22 and/or packaging station 24.

In some embodiments, the system shown in FIG. 1 can include an optional pump between mixing tank 20 and optional holding tank 21, between optional holding tank 21 and optional filter apparatus 22, and/or between optional filter apparatus 22 and packaging station 24. Such a pump can be in fluid communication with these components to facilitate transfer of a fluid between these components and to control the volume flow rate of the fluid.

In some embodiments, the system shown in FIG. 1 can include an optional mass flow controller between mixing tank 20 and optional holding tank 21, between optional holding tank 21 and optional filter apparatus 22, and/or between optional filter apparatus 22 and packaging station 24. Such a mass flow controller can be in fluid communication with these components to facilitate transfer of a fluid between these components and to control the mass flow rate of the fluid.

FIG. 4 illustrates another embodiment of a blending system for producing a chemical composition. As shown in FIG. 4, the system includes a plurality of material tanks 12, 14, 16, and 18, a plurality of pumps 13a, 13b, 13c, and 13d, a plurality of mass flow controllers 15a, 15b, 15c, and 15d, a mixing tank 20, a mixing device 17 attached to mixing tank 20, an optional holding tank 21, an optional filter apparatus 22, a packaging station 24, and an optional recirculation loop 26. Each of material tank 12, 14, 16, and 18 includes a load cell located (not labelled) beneath the tank.

Although the system shown in FIG. 1 has been described for the manufacturing of a polishing composition, the system can also be used to manufacturing chemical compositions other than polishing compositions, such as developers, etching compositions and cleaning compositions. One difference between the polishing composition and the other chemical compositions is that the polishing composition has particles, whereas the other chemical compositions may not have any particles. In ACP systems that manufacture chemical compositions that do not contain particles, the raw material feeds in material tanks 12, 14, 16, and 18 can include acids, bases, and diluents without the particle raw material feed.

This disclosure also features continuous methods of forming a chemical composition (e.g., a polishing composition such as a CMP slurry). The methods can include at least the following two steps: (1) mixing a plurality of continuous material flows in at least one mixing tank to form a chemical composition, each continuous material flow containing at least one component of the chemical composition; and (2) moving a continuous flow of the chemical composition to a packaging station downstream of the mixing tank. The mixing and moving steps can be performed continuously. In some embodiments, the material and chemical composition flows are in an in-process steady state such that there is a mass balance for the process during the continuous operation. In some embodiments, the mixing process in the at least one mixing tank includes at least one mixing method selected from the group consisting of turbulent mixing of the material flows, mechanical agitation of the material flows, recirculation of the chemical composition, and a combination thereof.

In some embodiments, before mixing the plurality of continuous material flows in the mixing tank, the methods described herein can further include providing a plurality of material tanks, each of which contains at least one component of a chemical composition and moving (e.g., continuously) a plurality of continuous material flows from the material tanks to the mixing tank. In some embodiments, the methods described herein can further include obtaining a material flow having a substantially constant flow rate (e.g., mass flow rate) prior to the mixing process in the mixing tank. For example, this can be achieved by continuous recirculation of the material flow in a material tank through at least one fluid transfer unit and at least one flow control unit until a predetermined flow rate is reached.

In some embodiments, the methods described herein can further include performing an in-process quality control measurement of the chemical composition in the mixing tank without interrupting the continuous process. For example, after the mixing step, the methods described herein can include a measuring step that measures the amount of at least one component (e.g., each component) in the mixing tank to determine whether the amount is within a predetermined range. The measuring step can be performed without stopping the mixing step (e.g., mixing components in the mixing tank to form a chemical composition) and/or the moving step (e.g., moving a continuous flow of the chemical composition to a packaging station). If the amount measured is outside the predetermined range, the amount of that component in the mixing tank can be adjusted by allowing more or less of that component to be added into the mixing tank.

In some embodiments, before moving the continuous flow of the chemical composition to the packaging station (e.g., before mixing the plurality of continuous materials flow in a mixing tank), the methods described herein can further include at least one step (e.g., two or three steps) selected from the group consisting of measuring a mass flow rate of each continuous material flow (e.g., by using a mass flow controller), measuring the volume flow rate of each continuous material flow (e.g., by using a pump), and measuring a content weight in a tank that supplies a continuous material flow containing at least one component (e.g., by using a load cell). Without wishing to be bound by theories, it is believed that these measurements can ensure that the chemical composition formed by the ACP methods described herein can have high product consistency, high yield, and reliable performance under a high throughput process.

In some embodiments, the continuous flow of the chemical composition exiting the mixing tank can have a relatively high volume flow rate, such as at least about 20 liters per minute (e.g., at least about 30 liters per minute, at least about 40 liters per minute, at least about 50 liters per minute, or at least about 60 liters per minute) and/or at most about 1,000 liters per minute (e.g., at most about 500 liters per minute, at most about 100 liters per minute, at most about 90 liters per minute, at most about 80 liters per minute, at most about 70 liters per minute, or at most about 60 liters per minute). As a result, the ACP methods described herein can have a relatively high throughput, thereby significantly increasing manufacturing efficiency and reducing manufacturing costs.

In some embodiments, before moving a continuous flow of the chemical composition to a packaging station, the methods described herein can include moving a continuous flow of the chemical composition to an optional holding tank (e.g., to ensure that the chemical composition exiting the mixing tank meets the predetermined specification).

In some embodiments, before moving a continuous flow of the chemical composition to a packaging station, the methods described herein can include an optional filtering step that includes (1) moving a continuous flow of the chemical composition to a filter apparatus and (2) filtering the chemical composition exiting from the mixing tank (e.g., to remove agglomerated particles or impurities). In such embodiments, the filtered chemical composition can then be moved the package station, in which the chemical composition can be used directly or packaged into a product for future uses. In embodiments where the methods described herein do not include a filtering step, the chemical composition exiting the mixing tank can be transferred to the packaging station directly.

In some embodiments, at least two (e.g., three, four, five, or all) of the following sub-steps in the methods described herein can be performed continuously: (1) moving the plurality of continuous material flows from the material tanks to the mixing tank, (2) mixing the plurality of continuous material flows in the mixing tank to form a chemical composition, (3) moving a continuous flow of the chemical composition to an optional holding tank, (4) moving a continuous flow of the chemical composition to an optional filter apparatus, (5) optionally filtering the chemical composition, and (6) moving the chemical composition (e.g., a filtered chemical composition) to a packaging station.

In some embodiments, the ACP methods described herein can be performed by using the system illustrated in FIG. 1. Referring to FIG. 1, the ACP methods described herein can include providing a plurality of material tanks 12, 14, 16, and 18, each of which contains at least one component of a chemical composition (e.g., a polishing composition such as a CMP slurry). A plurality of continuous material flows (each containing at least one component of the chemical composition) can then be moved from material tanks 12, 14, 16, and 18 to mixing tank 20 by using pumps 13a,b,c,d. Before moving the continuous material flows to mixing tank 20, all the raw materials (e.g. components of the CMP slurry) can go through a recirculation loop (e.g., loop 28) to obtain a substantially constant flow rate at a desired value. In mixing tank 20, the components can be combined and mixed continuously to form a chemical composition. The mass flow rates of the plurality of continuous material flows can be measured and adjusted continuously by using mass flow controllers 15a,b,c,d to ensure that appropriate amounts of components are added to mixing tank 20 to form the desired chemical composition. The volume flow rate of each continuous material flow and the content weight in each material tank 12, 14, 16, and 18 can also be measured and monitored to ensure the formation of the desired chemical composition.

A quality control step 19 can then be performed to measure the amount of at least one component (e.g., two, three, or all components) in mixing tank 20 to determine whether the amount is within a predetermined range. This step can be performed without interrupting the continuous method, such as stopping the other continuous steps (e.g., the mixing step or the step of moving a continuous flow of a chemical composition downstream) in the continuous methods.

When the system shown in FIG. 1 includes filter apparatus 22 (e.g., to manufacture a polishing composition), the continuous flow of the chemical composition formed in mixing tank 20 can be moved to filter apparatus 22 to filter the chemical composition. The filtered chemical composition can then be moved to packaging station 24 where the chemical composition can be used directly or packaged into a product for future use.

Before the chemical composition is moved to packaging station 24, an optional quality control step 23 can be performed to analyze the contents of the chemical composition (e.g., to determine whether the amount of a component in the chemical composition is within a predetermined range). If the chemical composition meets the targeted specification, it can then flow to packaging station 24.

In embodiments where the system shown in FIG. 1 includes holding tank 21 between mixing tank 20 and filter apparatus 22, the continuous method can include moving the continuous flow of the chemical composition from mixing tank 20 to holding tank 21 and from holding tank 21 to filter apparatus 22.

While certain embodiments have been disclosed, other embodiments are also possible.

In some embodiments, while pumps are described in connection with the systems shown in FIGS. 1 and 4, other fluid transfer units (such as gravitational feed units, pressurized tanks, or siphon feed units) can also be used in the blending systems described in this disclosure.

In some embodiments, while mass flow controllers are described in connection with the systems shown in FIGS. 1 and 4, other fluid flow controller units (such as volume flow controllers) can also be used in the blending systems described in this disclosure.

The contents of all publications cited herein (e.g., patents, patent application publications, and articles) are hereby incorporated by reference in their entirety.

The following examples are illustrative and not intended to be limiting.

EXAMPLES

Overview of Examples 1, 2 & 3

Figure 2:
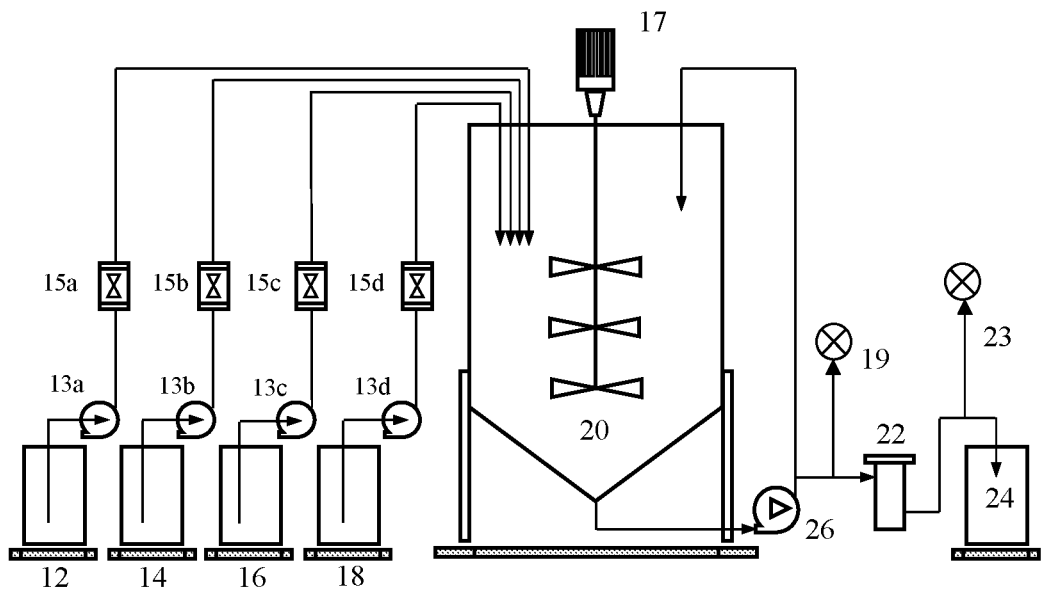
FIG. 2 is a drawing of a conventional batch process.
Figure 3:
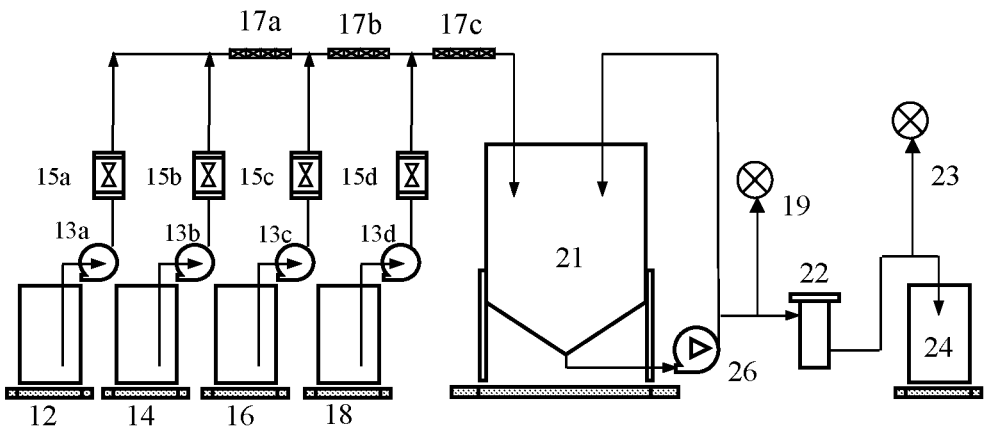
FIG. 3 is a drawing of a conventional continuous process.

Three representative examples are shown below. These examples compare an ACP process described in this disclosure with a conventional Batch process (also referred below as "Batch process" as shown in FIG. 2) and a convention Continuous process (also referred below as "Continuous process" as shown in FIG. 3). For each of the three examples, test results were collected over 100 production lots.

Example 1

Production Throughput Experiment

A detailed study for throughput analysis was performed on an ACP process, a conventional Batch process, and a conventional Continuous process. The procedures for these three processes are described below.

Batch Process (Comparative)

100 lots of a polishing composition were made using a batch manufacturing process. The polishing composition contained chemicals, water and silica abrasive particles. The chemicals included a carboxylic acid (Acid 2), an organic base (Base 2), and other chemicals. As illustrated in FIG. 2, for each lot, the above chemicals and water were pumped from material tanks 12, 14, and 16 into a 3000 gallon tank 20 (which serves both as a mixing tank and a holding tank) one by one through pumps 13a,b,c and mass flow controllers 15a,b,c. The silica abrasive dispersion was then pumped from material tank 18 into the tank 20 through pump 13d and mass flow controller 15d. Tank 20 contained a paddle type mixer 17, which was activated to mix all the components. After several hours of mixing, filtration and packaging operations were initiated. Specifically, the mixed polishing composition from the tank 20 was pumped through a filter apparatus 22 (which contained several filter banks) into a packaging station 24 (which included drums or totes) that hold the finished product. Quality control was performed on the packaged polishing composition. The production throughput was measured by dividing the number of gallons packaged by the total time used to make that particular lot of polishing composition. The total time included the time to introduce all the chemicals, water and abrasive dispersion, the mixing time, and the filtration and packaging time. The normalized throughput data are summarized in FIG. 5.

Continuous Process (Comparative)

100 lots of the polishing composition were made using a continuous static mixer blending process. The polishing composition is similar to the polish composition made from the Batch process except that it contained Acid 1 and Base 1 (instead of Acid 2 and Base 2). In this process, raw materials such as chemicals, water, and abrasive dispersion were mixed using a number of in-line static mixers. This was done sequentially as follows:

As illustrated in FIG. 3, raw material 1 and raw material 2 were pumped from material tanks 12 and 14 into the first in-line static mixer 17a through pumps 13a,b and mass flow controller 15a,b. This mixture in mixer 17a and raw material 3 from material tank 16 were then pumped into the second in-line static mixer 17b. This mixture in mixer 17b and raw material 4 from material tank 18 were then pumped into the third in-line static mixer 17c. Materials 3 and 4 were pumped into in-liner mixers 17b,c by using pumps 13c,d and mass flow controllers 15c,d. This continuous flow process continued until all the raw materials were mixed. Finally, the mixture thus obtained was introduced into a holding tank 21. A quick quality control step 19 of selected parameters (e.g., conductivity) was performed and the mixed polishing composition was sent to a filter station 22 and then to a packaging station 24. The continuous process continued until a certain number of drums or totes where filled. The production throughput was measured by dividing the number of gallons packaged by the total time of production. The normalized throughput data are summarized in FIG. 5.

Advanced Continuous Process (ACP) of this Disclosure 100 lots of the same polishing composition were produced using the blending system described in FIG. 1 or 4.

The production throughput for the ACP process was measured by dividing the number of gallons packaged by the production time.

Figure 5:
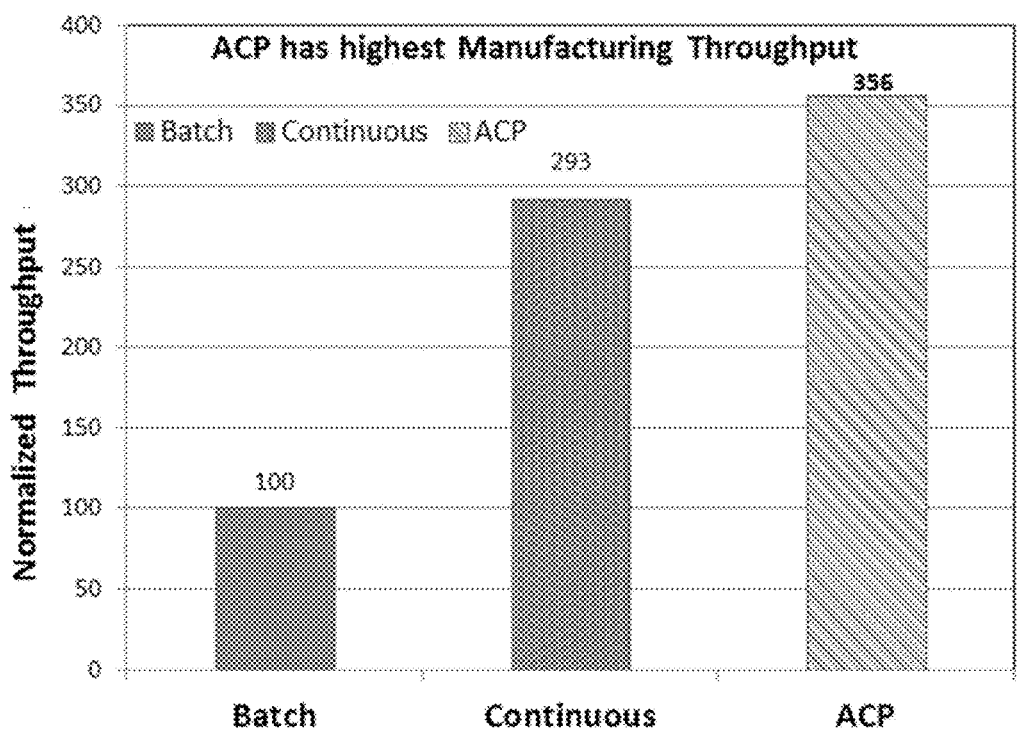
FIG. 5 is a bar graph depicting normalized manufacturing throughput for three different manufacturing processes, i.e., a conventional Batch process, a conventional Continuous process (CP), and an ACP process, each of which was obtained based on a 100-lot scale.

The normalized throughput in gallons per unit time for the Batch, Continuous and ACP processes is shown in FIG. 5. As can be seen in FIG. 5, when the Batch process had a normalized throughput of 100 gallons per minute, the Continuous process had a throughput of 293 gallons per minute and the ACP process has a throughput of 356 gallons per minute. In other words, the ACP process had a throughput of about 3.5 times the throughput of the Batch process and about 1.2 times the throughput of the Continuous process. FIG. 5 clearly demonstrate that the ACP process described in this disclosure had a significantly larger throughput than the comparative Batch and Continuous processes, which would result in substantial cost-savings.

Example 2

Product Overall Quality and Production Process Consistency Experiment

A detailed study was performed to analyze the quality of the products obtained from the three processes described in Example 1 and how process variations impacted the product quality. As stated earlier, analytical QC data/process parameters were collected for the 100 production runs of each of the three processes: Batch, Continuous and ACP. These parameters were measured for three samples for a finished lot. Thus, for each manufacturing process, since there were 100 production runs, 300 data points were collected for any parameter. The three samples in a particular lot were respectively drawn from the starting package of the lot (e.g., the first drum), the middle package of the lot, and the last package of the same lot.

In general, each component in a composition has a particular electron mobility. This electron mobility of the individual components is measured by conductivity. The overall conductivity of the composition is a sum of the individual conductivities of the components. As such, if the conductivity is consistent for multiple production lots, it suggests that there are minimal process variations and the quality of the end product is considered good. Thus, conductivity "variation" of the composition can be a key indicator of the overall product quality and production process consistency.

Figure 6:
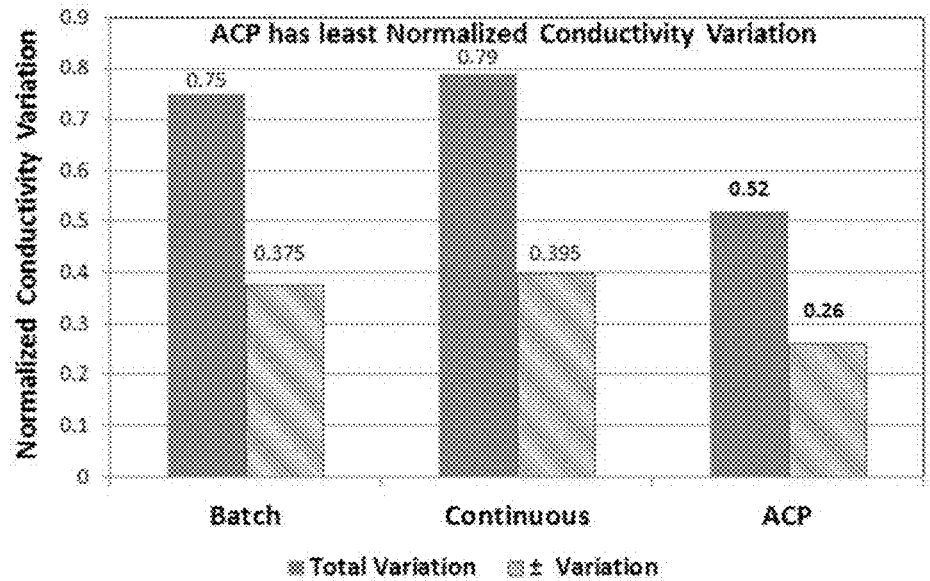
FIG. 6 is a bar graph depicting normalized conductivity lot-to-lot variations (i.e., total and ±variations) obtained from the three different manufacturing processes referred to in FIGS. 2 to 4 based on a 100-lot scale.

In this example, conductivity for each of the 100 production runs was measured for each of the three processes. The conductivity was measured using a METTLER TOLEDO S-47 pH/Conductivity Meter. The mean of the conductivity value measured by the Conductivity Meter was calculated. Thereafter, normalized conductivity variations were measured as standard deviations from this mean value for each of the 3 processes. The normalized total lot-to-lot conductivity variation and the normalized ±lot-to-lot variation in conductivity for the Batch, Continuous and ACP processes are plotted in FIG. 6. It should be noted that the ±variation is half of the total variation. FIG. 6 clearly demonstrates that the ACP process was surprisingly superior compared to the two conventional manufacturing processes as the ACP process had a total lot-to-lot conductivity variation (i.e., 0.52) significantly less than the total lot-to-lot conductivity variation of the Batch process (i.e., 0.75) or the total lot-to-lot conductivity variation of the Continuous process (i.e., 0.79). Thus, the product quality from the ACP process was much superior and the ACP process had much better production process consistency when compared to the two comparative processes.

Example 3

Product Component Quality and Raw Material Feed Consistency Experiment

The semiconductor industry is very stringent in terms of consumable product quality as the consumables massively impact the yields of their end chip products. Thus, for consumables such as polishing compositions or chemical compositions, the concentrations of the individual raw components are monitored and are reported in the Certificate of Analysis accompanying the sold product. Thus, it is imperative that the quality/concentration of each product component is satisfactory, and there is minimal variation in the concentrations of individual components of the products. If the concentrations of the raw materials (e.g., acids or bases) fall out of the control limits defined by the customer, the product is not deemed as sellable and must be discarded by the vendor, resulting in product waste.

Thus, experiments were performed to determine the concentration consistency of the components of the products obtained from the three processes described in Example 1. The acid and base concentrations for the 100 production runs for each of the three processes were measured in a sampling manner identical to that described in Example 2. To measure the concentration of an acid or base, a HPLC supplied by Thermo Fisher Scientific Company was used.

Figure 7:
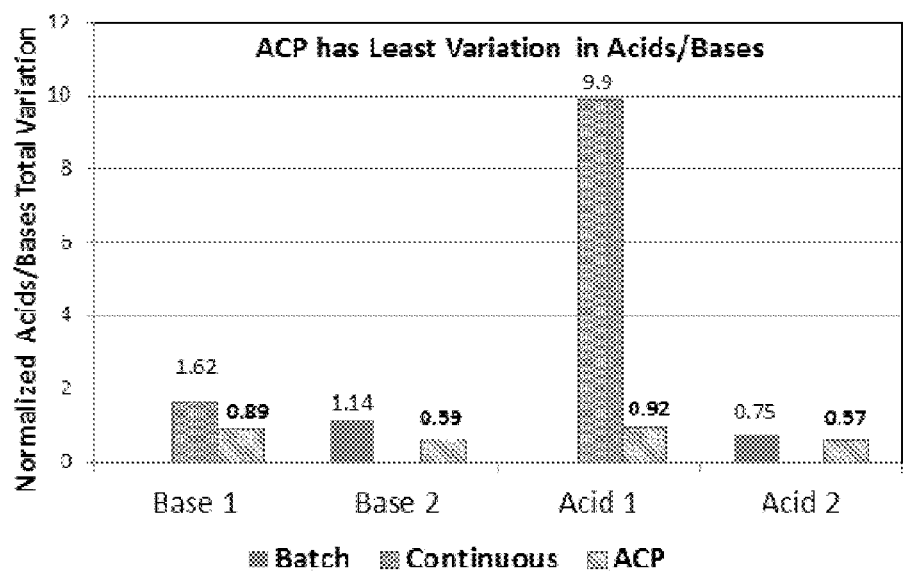
FIG. 7 is a bar graph depicting normalized lot-to-lot total variations in base and acid concentrations obtained from the three different manufacturing processes referred to in FIGS. 2 to 4 based on a 100-lot scale.

Base 1 and Acid 1 were analyzed in the Continuous process, whereas Base 2 and Acid 2 were analyzed in the Batch process. For the ACP process, all four of Base 1, Base 2, Acid 1 and Acid 2 were analyzed. As can be seen from FIG. 7, the normalized acids/bases total lot-to-lot variation for the ACP was surprisingly much less than those obtained from the Batch and Continuous processes. This confirms that the ACP products have much more consistent concentrations of the individual components. Specifically, the total lot-to-lot variations of Acid 1 and Base 1 obtained from the Continuous process were 9.9 and 1.62, respectively, which were significantly higher than those obtained from the ACP process, i.e., 0.92 for Acid 1 and 0.89 for Base 1. Similarly, the total lot-to-lot variations of Acid 2 and Base 2 obtained from the Batch process were 0.75 and 1.14, respectively, which were significantly higher than those obtained from the ACP process, i.e., 0.57 for Acid 2 and 0.59 for Base 2.

Thus, this example further confirms the superiority of the ACP process over the two comparative processes.

Other embodiments are within the scope of the following claims.

What is claimed is:

1. A method of forming a chemical composition, the method comprising:
    mixing a plurality of continuous material flows in at least one mixing tank to form a chemical composition, each continuous material flow comprising at least one component of the chemical composition, the at least one mixing tank having a volume of from about 10 liters to about 1500 liters, and the chemical composition being a polishing composition prepared from components comprising a diluent, an acid, a base, abrasive particles and optionally a salt; and
    moving a continuous flow of the chemical composition to a packaging station downstream of the at least one mixing tank;
    wherein the mixing and moving steps are performed continuously,
    wherein the material and chemical composition flows are in an in-process steady state; and
    wherein the mixing step in the at least one mixing tank comprises at least one mixing method selected from the group consisting of turbulent mixing of the material flows, mechanical agitation of the material flows, recirculation of the chemical composition, and a combination thereof.

2. The method of claim 1, further comprising obtaining a material flow having a substantially constant flow rate prior to the mixing step.

3. The method of claim 2, wherein obtaining a material flow having a substantially constant flow rate comprises continuous recirculation of the material flow in a material tank through at least one fluid transfer unit and at least one flow control unit until a predetermined flow rate is reached.

4. The method of claim 1, further comprising performing an in-process quality control measurement of the chemical composition in the mixing tank without interrupting the continuous process.

5. The method of claim 1, wherein the mixing tank has a volume of from about 40 liters to about 1500 liters.

6. The method of claim 1, wherein the chemical composition is a polishing composition prepared from components comprising a diluent, an acid, a base, a salt, and abrasive particles.

7. The method of claim 6, wherein the diluent comprises deionized water.

8. The method of claim 6, wherein the acid comprises an organic acid, an inorganic acid, or a mixture thereof.

9. The method of claim 6, wherein the base comprises potassium hydroxide, ammonium hydroxide, monoethanol amine, diethanol amine, triethanol amine, quaternary ammonium compounds or a mixture thereof.

10. The method of claim 6, wherein the salt comprises potassium citrate, potassium carbonate, ammonium nitrate, ammonium sulfate, ammonium citrate, ammonium oxalate, potassium nitrate, potassium sulfate, potassium chloride, or a mixture thereof.

11. The method of claim 6, wherein the abrasive particles comprise silica, ceria, titania, alumina, or a mixture thereof.

12. The method in claim 6, where the abrasive particles comprise colloidal silica.

13. The method of claim 12, wherein the continuous flow of the chemical composition comprises at most about 50 wt % silica.

14. The method of claim 1, wherein the continuous flow of the chemical composition has a pH of from about 2 to about 11.

15. The method of claim 14, wherein the continuous flow of the chemical composition has a pH of from about 2 to about 9.

16. The method of claim 1, further comprising continuously moving the chemical composition into a holding tank prior to packaging.

17. The method of claim 1, further comprising filtering the continuous flow of the chemical composition before moving the continuous flow of the chemical composition to the packaging station.

18. The method of claim 1, wherein the continuous flow of the chemical composition exiting the mixing tank has a volume flow rate of at least about 20 liters per minute.

19. The method of claim 1, wherein the method forms a chemical composition having a total lot-to-lot variation of at most about 1% in the weight of a component.

20. The method of claim 1, wherein the method forms a chemical composition having a total within lot variation of at most about 1% in the weight of a component.

21. A method of forming a chemical composition, the method comprising:
    mixing a plurality of continuous material flows in at least one mixing tank to form a chemical composition, each continuous material flow being a liquid and comprising at least one component of the chemical composition, the at least one mixing tank having a volume of from about 10 liters to about 1500 liters; and
    moving a continuous flow of the chemical composition to a packaging station downstream of the at least one mixing tank;
    wherein the mixing and moving steps are performed continuously,
    wherein the material and chemical composition flows are in an in-process steady state; and
    wherein the mixing step in the at least one mixing tank comprises at least one mixing method selected from the group consisting of turbulent mixing of the material flows, mechanical agitation of the material flows, recirculation of the chemical composition, and a combination thereof.

22. The method of claim 21, further comprising obtaining a material flow having a substantially constant flow rate prior to the mixing step.

23. The method of claim 22, wherein obtaining a material flow having a substantially constant flow rate comprises continuous recirculation of the material flow in a material tank through at least one fluid transfer unit and at least one flow control unit until a predetermined flow rate is reached.

24. The method of claim 21, further comprising performing an in-process quality control measurement of the chemical composition in the mixing tank without interrupting the continuous process.

25. The method of claim 21, wherein the mixing tank has a volume of from about 40 liters to about 1500 liters.

26. The method of claim 21, wherein the chemical composition is a polishing composition prepared from components comprising a diluent, an acid, a base, a salt, and abrasive particles.

27. The method of claim 26, wherein the diluent comprises deionized water.

28. The method of claim 26, wherein the acid comprises an organic acid, an inorganic acid, or a mixture thereof.

29. The method of claim 26, wherein the base comprises potassium hydroxide, ammonium hydroxide, monoethanol amine, diethanol amine, triethanol amine, quaternary ammonium compounds or a mixture thereof.

30. The method of claim 26, wherein the salt comprises potassium citrate, potassium carbonate, ammonium nitrate, ammonium sulfate, ammonium citrate, ammonium oxalate, potassium nitrate, potassium sulfate, potassium chloride, or a mixture thereof.

31. The method of claim 26, wherein the abrasive particles comprise silica, ceria, titania, alumina, or a mixture thereof.

32. The method in claim 26, where the abrasive particles comprise colloidal silica.

33. The method of claim 32, wherein the continuous flow of the chemical composition comprises at most about 50 wt % silica.

34. The method of claim 21, wherein the continuous flow of the chemical composition has a pH of from about 2 to about 11.

35. The method of claim 34, wherein the continuous flow of the chemical composition has a pH of from about 2 to about 9.

36. The method of claim 21, further comprising continuously moving the chemical composition into a holding tank prior to packaging.

37. The method of claim 21, further comprising filtering the continuous flow of the chemical composition before moving the continuous flow of the chemical composition to the packaging station.

38. The method of claim 21, wherein the continuous flow of the chemical composition exiting the mixing tank has a volume flow rate of at least about 20 liters per minute.

39. The method of claim 21, wherein the method forms a chemical composition having a total lot-to-lot variation of at most about 1% in the weight of a component.

40. The method of claim 21, wherein the method forms a chemical composition having a total within lot variation of at most about 1% in the weight of a component.

* * * * *